…

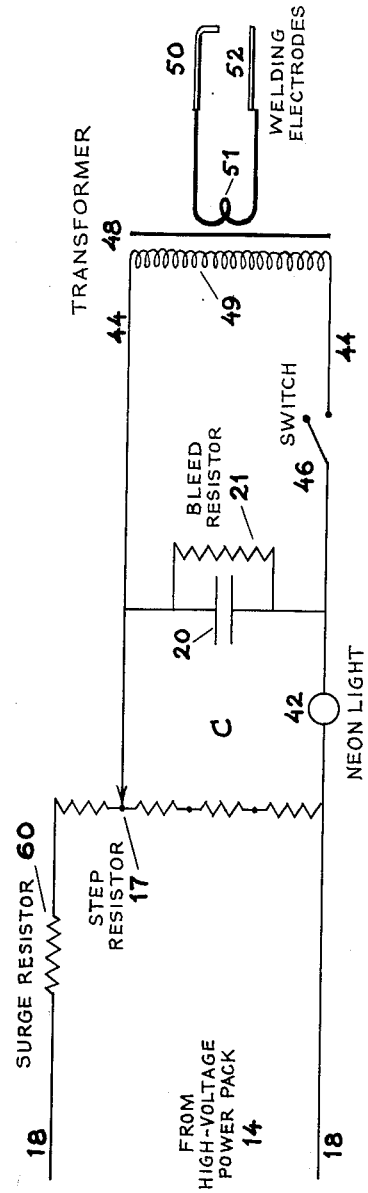

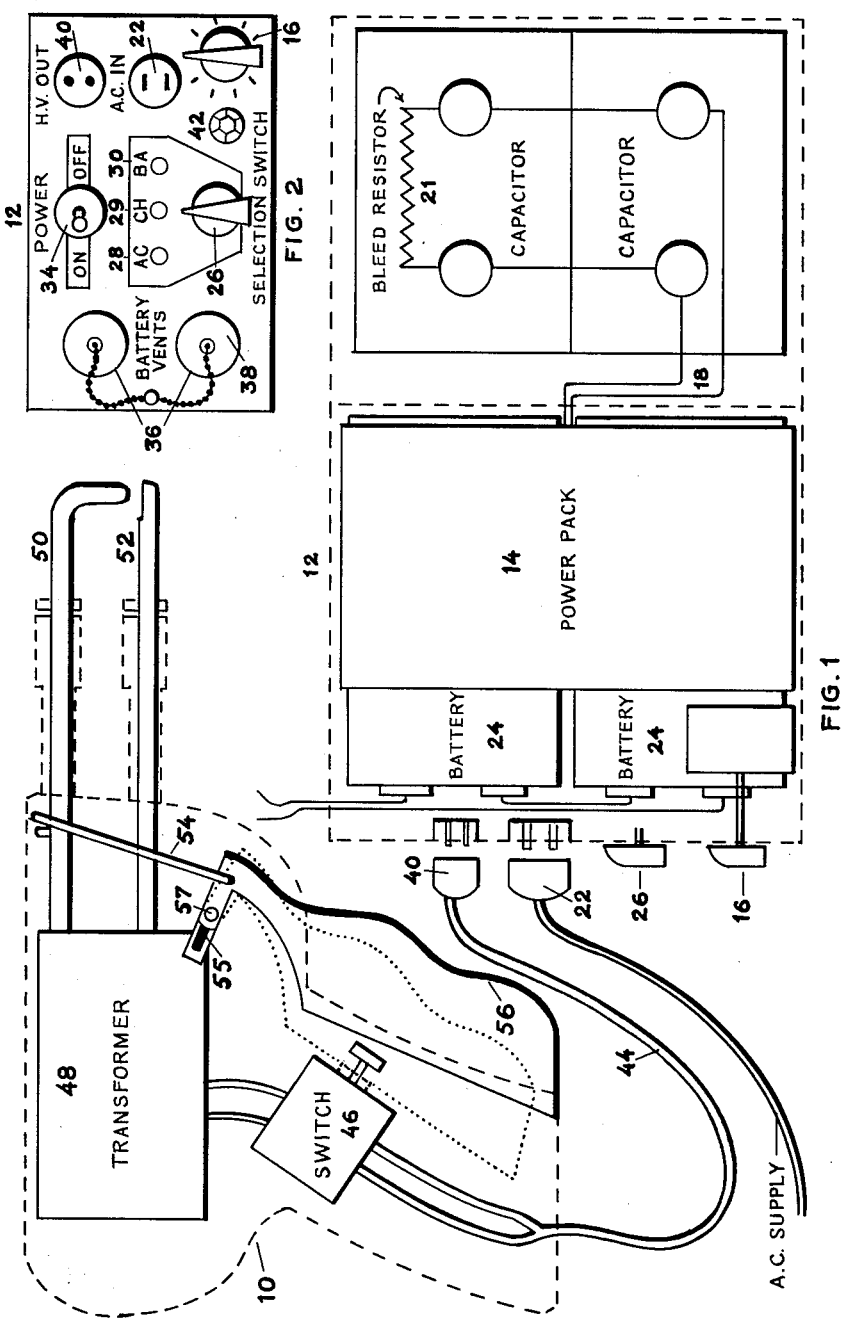

United States Patent Office 3,050,618
Patented Aug. 21, 1962

3,050,618
PORTABLE SPOT WELDING TOOL
Martin N. Fischer, 2605 Gaither St., Washington 21, D.C.
Filed July 13, 1961, Ser. No. 126,438
1 Claim. (Cl. 219—90)

This invention relates to a welding system; more particularly this invention relates to a portable welder capable of delicate work.

In many insatnces, particularly during construction or repair of electronic equipment, where wires must be permanently connected, soldering irons cannot be conveniently brought into proper contact with the desired connection. Even worse, heating effects caused by the hot soldering iron can damage delicate equipment. Spot welding offers a possible alternative, but here again gross heating effects must be avoided. Furthermore, the welding unit must be capable of delicate work and maneuverable into inaccessible locations. Inasmuch as the need for such delicate spot welding frequently arises where shop facilities are unavailable, maximum portability is a highly desirable feature.

The prime object of this invention is to provide a spot welder capable of delicate work.

A further object of this invention is to provide a portable spot welder weighing less than fifteen pounds.

Still another object is to provide a portable welding tool with a welding gun no heavier than a light weight soldering iron.

Further objects and advantages of this invention will be apparent from the more detailed description which follows.

Briefly stated, this invention contemplates a capacitance welding system wherein the electrical circuit for the welding electrodes is divided between a welding gun and a control box. Inside the control box is positioned a power pack and a capacitor. The power pack, which can be of a standard high voltage design such as the Thoradson Universal Power Pack, should allow for connection alternatively to A.C. (e.g., 110 v., 60 cycles) or the direct current available from small storage batteries. The batteries can be incorporated inside the control box; and the power pack has a built-in charging circuit to permit battery recharging from the A.C. source. Suitably, an indicator with a low current drain, e.g. a neon bulb, meter, etc. can be connected across the condenser to show when the condenser has been completely charged.

In the welding gun is located a transformer having a high step-down ratio for the voltage. The transformer secondary is connected to the welding electrodes and a flexible wire serves as a line connecting the condenser in the control box to the transformer primary in the welding gun. Suitably, a trigger on the welding gun controls a switch in this line. The relationship between the various components is a critical factor in this invention.

In order that the invention may be more readily understood, reference will now be had to the accompanying diagrammatic drawing illustrating a preferred mode of apparatus embodying this invention wherein:

FIGURE 1 represents a side view of the welding system, the housing of the control box and of the gun being shown in outline form.

FIGURE 2 is a top view of the control box.

FIGURE 3 is a wiring diagram of the spot welder of the present invention.

The welding system as a whole comprises a welding gun 10 and a control box 12. Inside box 12 is a variable high voltage power pack 14. The voltage level of the output from the power pack is determined by a control knob 16 set on the top of box 12 (FIGURE 2). Power pack 14 is connected by suitable leads 18 to a capacitor 20. Thus, a 30 microfarad capacitor has proved eminently satisfactory with a 2500 volt power pack.

Power pack 14 is also connectable to a source of alternating current through outlet 22 (FIGURE 2) or to the low voltage source of direct current represented by storage batteries 24. Selection switch 26 set on top of box 12 serves to appropriately connect power pack to the A.C. source tap 28 or to the battery source of current tap 30 or to connect the A.C. source to the battery charging circuit in the power pack. An on-off control can be included in selection switch 26, but preferably a separate on-off switch 34 is provided on the top of box 12 for interrupting the circuit at an appropriate point in power pack 14.

The power pack is only diagrammatically illustrated because per se it is well known to the art and per se forms no part of this invention. Power packs which are either commercially available or can be constructed from standard design, provide the 3000 volts and contain the 150 microfarad condenser contemplated as the upper limits for this invention. Such standard power packs also provide for incorporating small storage batteries 24 into the unit; alternative use of an A.C. supply; and a charging circuit so that the A.C. can charge the batteries. Also customary is a bleed resistor connected across the capacitor 20 as a safety measure to slowly discharge the capacitor should the unit be turned off when fully charged.

To allow for variation in the current supplied to welding gun 10, a step resistor 17 or a rheostat is interposed between the power pack circuit and capacitor 20, with control knob 16 serving to select the voltage applied to capacitor 20 according to whether capacitor 20 is connected across all or any selected part of step resistor 17. A suitable indicator 42 such as a meter or a small neon light is connected in the circuit near the capacitor. Thus, as shown, indicator 42 can be located in the lead between step resistor 17 and capacitor 20.

A pair of battery vents 36 are provided on the top of box 12 both to relieve any gases evolved from the battery and for adding water when needed. Ordinarily, vents 36 are closed by plugs 38 which, in turn, are chained to the top of box 12. The size and type of battery is not critical and therefore subject to wide variation. Thus, small storage batteries commercially available are suitable, e.g. Willard #ER–6–2B—a two volt battery. The kilowatt hour rating of batteries 24 determines the amount of service which the welding system can give before recharging is necessary. For use by a travelling mechanic who has no source of A.C. at the locations where repairs must be made, an additional pair of taps may be placed on box 12 (not shown) suitably connected with resistances to the terminals of batteries 24 so that the mechanic can recharge batteries 24 while driving from job to job.

The high voltage current stored in capacitor 20 is transmitted through a high voltage outlet plug 40 and a flexible, thin wire 44 to welding gun 10. The wire is as flexible as possible, consistent with the use, and may for example be a flexible #18 stranded wire suitably insulated. An ordinary wire rated at 15 amps. (house lamp cord size) is also satisfactory provided it has a high resistance to arcing. The wire, of course, would be undersized for the voltage and current that would pass through on a continuous basis, but the discontinuous nature of the spot welding system as will be explained later, prevents overheating and permits a light, flexible wire to serve as the connection.

Inside gun 10, wire 44 leads to a normally open switch 46 connected across the line and from there into the primary coil 49 of a transformer 48. The transformer secondary 51 is connected to welding electrodes 50, 52. A loop 54 around the upper electrode 50 is connected to a trigger 56 so that, when the trigger is pulled, it bends electrode 50 downward toward contact with lower electrode 52. The welding gun electrodes 50, 52 may be provided with replaceable tips (not shown) so that the welding tool may come equipped with various pairs of welding tips, each particularly designed for a different welding use. Also, the loop 54 may have an adjustable connection (not shown) to trigger 56 for adjusting pressure applied by the tips of electrodes 50, 52 to the work. If desired, means othert han loop 54 may be used to cause the work to be clamped between the welding tip, and the clamping means, e.g. loop 54 can be actuated independently of trigger 56.

When a pair of wires to be welded are positioned between electrodes 50, 52 and trigger 56 is pulled to the limit shown in dashed lines on FIGURE 1, switch 46 is closed discharging a surge of high voltage current from capacitor 20 through flexible wire 44 into the primary coil of transformer 48. The current builds up gradually in wire 44 and the primary coil of transformer so there is no arcing in the contacts of switch 46. The gradual build-up of current in the primary coil also provides a gradual build-up of the field in the core of transformer 48, inducing current flow in the secondary of the transformer. The core of transformer 48 is preferably toroidal in shape. The turns of the primary coil should be successively wound around the core to minimize the voltage gradient through the insulation between adjacent turns. The primary coil provides a very large step down in voltage. For example, 400–2000 turns of wire is satisfactory for the primary coil, and only a single turn in the secondary coil of transformer 48.

Transformer 48 changes the surge of high voltage low current into a surge of low voltage high current which passes through electrodes 50, 52 and spot welds the wires together. When viewed on an oscilloscope, the surge of current exhibits a damped sine wave like oscillation resulting from the high "1" of the transformer and the high "C" of the supply. Essentially, the current flows for only a single cycle, lasting about 5–10 milliseconds. By the time an operator can release the trigger the current surge is over.

Because current trickles out from power pack 14 into capacitor 20, continued D.C. discharge into transformer 48 during the time trigger 56 is depressed would be undesirable. Safety features known to the art may be incorporated in the electrical circuit. Thus, a surge resistor 60 may be placed between the power supply and capacitor 20, or a trigger relay excited from the gun can disconnect the capacitors from the power supply and connect the capacitors to flexible wire 44. This expedient requires additional leads from control box 12 to switch 46 in welding gun 10 for connecting a source of power, suitably the battery, to the switch so that the relay is triggered by switch 46.

Upon release of trigger 56, capacitor 20 begins to recharge. Desirably, power pack 14 and capacitor 20 are correlated so that recharge time exceeds three seconds. Even a ten or fifteen second recharge time is not excessive for this welding tool because there is necessarily some time lag in repositioning the welding gun on a new pair of wires to be welded. More than 30 seconds for recharging, however, becomes irksome to the user. The specific advantage of a three-second or more time interval between welds lies in the need to dissipate heat induced in the tool by the surge of current as condenser 20 discharges. The energy stored in capacitor 20 is released rapidly, i.e. in about 5–10 milliseconds. By far the largest portion of this energy is released as heat at the ends of electrodes 50, 52, welding together the wires or other objects positioned between the electrodes. The hot weld immediately begins to cool down by conduction of heat back into the welding electrodes, along the lengths of the objects welded together, and by radiation from the weld. Thus, there is at least a 300 to 1 ratio between the cooling time of at least three seconds and the heating time of at most about ten milliseconds. The total amount of energy released at the weld can range from about 25 watt seconds (joules) to about 350 watt seconds (joules). Apparently, the bulk of this energy is conducted from the weld back into the welding electrodes almost immediately because the weld itself can be touched with the naked hand in less than a minute. The electrodes, being massive compared to the wires welded, heat only a few degrees and cool back substantially to room temperature during the recharging interval. Thus, during the recharging time interval, the unit as a whole cools substantially back down to room temperature. As a result, wiring in wire 44 which would be destroyed by continued passage of current is completely safe because the forced time interval between current surges allows sufficient cooling to occur. This in turn leads to increased portability.

The size of the components and the relationship between them is of critical importance. The rating of capacitor should be between 10 microfarads and 150 microfarads. The step-down ratio of transformer 48 should be between 400 to 1 and 2000 to 1. The size of these two components is correlated to make the larger transformer step down ratio correspond to the larger capacitor size. Thus, a 30 microfarad capacitor was used with about a 600–1 step-down ratio in a transformer measuring about 150 millihenries in inductance. The product of capacitance times inductance (the transformer) varies from an LC of about $1 \times 10^{-6}$ to about $100 \times 10^{-6}$ within the above stated ranges for transformer step down and capacitance. Inasmuch as the LC product affects the current surge, the correlation of high capacitance to high step down ratio and vice versa serves to attain the damped cycle desired for the surge of welding current. As a further desirable result, the duration of the current surge which ranges from about 1 millisecond to about 10 milliseconds does so in accord with the value of the LC product. Accordingly, the desired gradual build-up of current is characteristic of the entire range from maximum capacitance to minimum capacitance. Accordingly, wire 44 need never be larger than #18 stranded (lamp cord). Also, the primary coil of the transformer can be a suitably insulated #20 wire series wound around a toroidal core.

The voltage delivered by power pack 14 can range from about 400–3000 and as previously mentioned should be capable of adjustment (from control knob 16) from the 400 minimum to whatever maximum the power pack can deliver (if less than 3000). On an overall basis, the minimum conditions for a spot welding tool constructed according to the principles of this invention are: 400 volts, a 10 microfarad capacitor and a 400 to 1 step-down ratio transformer. The maximum are 3000 volts, a 150 microfarad capacitor and a 2000 to 1 step-down ratio. Of course, the minimum conditions (capable of welding together #20 wires) do not have the welding capacity of the maximum conditions (capable of welding together #12 wires), but even the maximum conditions allow of a welding gun approximating the size of a soldering iron and a total weight of gun and control box not appreciably exceeding fifteen pounds.

This invention is not limited to the particular details of construction described as many equivalents will suggest themselves to those skilled in the art. It is accordingly desired that the appended claim be given a broad interpretation commensurate with the scope of the invention within the art.

The present application is a continuation-in-part of my copending application, Serial No. 595,429, filed July 2, 1956, for Portable Spot Welding Tool, now abandoned.

What I claim is:

A portable spot welding tool comprising a power capacitance having a rating within the range 10 to 150 microfarads, a potentiometer having a first and a second terminal and a slider contact, said capacitance having terminal of said capacitance to said slider contact, a high voltage power source for delivering voltage at low current directly between said first and second contacts of said potentiometer, a voltage indicator, means connecting said voltage indicator between said second terminals of said power source and said capacitance, a welding gun, said welding gun including a voltage step-down transformer having a primary winding and a secondary winding and having a voltage step-down ratio from primary to secondary winding falling within the range 300:1 to 2000:1, a connection between said first terminal of said capacitance and a terminal of said primary winding, a long lead extending between said second terminal of said capacitance and a further terminal of said primary winding, a normally open switch connected in series with said lead and mounted on said welding gun, said welding gun having a trigger mounted therein and arranged for actuating said switch from normally open to closed condition in response to actuation of said trigger, a pair of welding electrodes directly connected across said secondary winding, the values of said capacitance, the inductances of said transformer windings and the resistance value of a normal welding load suitable for said welding tool being such that on closure of said switch the stored energy of said capacitance discharges as only a single complete cycle of a damped sinusoid through said primary winding via said switch, said damped sinusoid having a period of approximately 5 to 10 milliseconds.

References Cited in the file of this patent

UNITED STATES PATENTS

| | | |
|---|---|---|
| 2,184,627 | Watson | Dec. 26, 1939 |
| 2,459,153 | England | Jan. 18, 1949 |
| 2,477,622 | Klemperer | Aug. 2, 1949 |
| 2,651,701 | Backen | Sept. 8, 1953 |
| 2,760,041 | Yonkers | Aug. 21, 1956 |